United States Patent [19]

Gharavi

[11] Patent Number: 5,235,420
[45] Date of Patent: Aug. 10, 1993

[54] MULTILAYER UNIVERSAL VIDEO CODER

[75] Inventor: Hamid Gharavi, Red Bank, N.J.

[73] Assignee: Bell Communications Research, Inc., Livingston, N.J.

[21] Appl. No.: 673,958

[22] Filed: Mar. 22, 1991

[51] Int. Cl.$^5$ .............................................. H04N 7/12
[52] U.S. Cl. .................................. 358/136; 358/133; 358/135; 358/138
[58] Field of Search ................ 358/133, 135, 138, 426, 358/136

[56] References Cited

U.S. PATENT DOCUMENTS

| | | | |
|---|---|---|---|
| 4,821,119 | 4/1989 | Gharavi | 358/136 |
| 4,829,378 | 5/1989 | Le Gall | 358/426 |
| 4,918,524 | 4/1990 | Ansari et al. | 358/133 |
| 4,969,040 | 11/1990 | Gharavi | 358/135 |
| 5,097,331 | 3/1992 | Chen et al. | 358/138 |
| 5,136,374 | 8/1992 | Jayant et al. | 358/133 |

OTHER PUBLICATIONS

"Video Codec for Audiovisual Service at p×64 kbits/s", *Draft Revision of the CCITT Recommendation H.261, WP XV/1 Report*, Part II, Dec. 1, 1989, pp. 2–22.
"Sub-Band Coding of Monochrome and Color Images", H. Gharavi, A. Tabatabai, *IEEE Trans. on Circuits and Systems*, vol. 35, No. 2, Feb., 1988, pp. 207–214.
"Subband-Based CCITT Compatible Coding for HDTV Conferencing", H. Gharavi, *Proceedings IEEE Globecom '90*, Dec., 1990, pp. 978–981.

*Primary Examiner*—Ulysses Weldon
*Assistant Examiner*—Minsun Oh
*Attorney, Agent, or Firm*—Leonard Charles Suchyta; Stephen M. Gurey

[57] ABSTRACT

A video coder is disclosed which codes the digital pel values of a video signal in such a manner that different levels of picture quality, i.e. resolution, are available to users. The coder uses a two-dimensional quadrature-mirror filter (103) to decomposes the input into plural subbands. The baseband lowest horizontal-lowest vertical frequency subband is coded using a hybrid DCT/DPCM coder (104) that is compatible with a proposed CCITT standardized codec. The output of this coder is a layer 1 signal which is available to subscribers who desire only low-quality video service. The other subbands are coded using an interframe DPCM coder (108, 109, 110, 111) for those subbands in which the filtered samples in the subband represent horizontal or vertical edge variations in the video frame, or an intraframe PCM coder (116, 117) for those subbands in which the filtered samples in the subband represent diagonal variations. Other layer signals are formed by combining the outputs of selected of the interframe and intraframe codes. A user subscribing to increasing number of signal layers is able to reconstruct a signal of increasing quality.

7 Claims, 7 Drawing Sheets

MULTILAYER UNIVERSAL VIDEO CODER

BACKGROUND OF THE INVENTION

This invention relates to the coding of video signals, and more particularly to a coding system that is suitable for a wide range of video coding applications.

The CCITT SGXV has recently drafted a coding scheme for video-phone and video-conferencing services ("Video Codec for Audiovisual Service at P×64 kbits/s" draft revision of the CCITT recommendation H.261, WPXV/1 report, Part II, Dec. 1, 1989). This standardized codec is designed to operate at very low speeds, i.e. multiple rates of 64×n (n=1-32) kb/s for video-phone and video-conferencing applications. For video-conferencing the spatial and temporal resolution of the input is set at 360 (pels)×288 (lines) and 29.97 frames/sec, respectively (Common Intermediate Format, CIF). For video-phone, where the transmission rate is lower (i.e., 64 kb/s), the spatial resolution is reduced to ¼ CIF (i.e., 180×144). Consequently, at these speeds and resolutions, the codec may be unable to produce video with the quality that can support all the needs of the business community. The proposed standard, however, is expected to provide worldwide availability of the CCITT codec at a reasonably low cost.

With the expected wide deployment of optical facilities in the near future, and the availability of broadband systems such as Broadband ISDN (BISDN), a wider range of higher quality digital video services will likely be in demand, where quality is generally meant to means spatial resolution (i.e., the number of pels per scan line × the number of scan lines per video frame). It is reasonable, therefore, to expect a wide range of quality video services such as Extended Quality Television (EQTV), High Definition Television (HDTV), and future super HDTV, to be available together with the lower-quality video services such as the video-phone and video-teleconferencing services. To maximize the integration of all these various quality video services, a single coding system which can provide an unlimited range of video services is desirable. Such a coding system would enable users of different qualities to communicate with each other. For example, a subscriber to a only lower quality grade of video service should be capable of decoding and reconstructing a digitally transmitted higher quality video signal, albeit at the lower quality service level to which he subscribes. Similarly, a higher quality service subscriber should be capable of decoding and reconstructing a digitally transmitted lower quality video signal although, of course, its subjective quality will be no better than its transmitted quality.

In addition to enabling video service subscribers to different grades of quality communicate with each other, a system architecture that utilizes basic hardware building blocks for all levels of service would permit the upward migration of a lower quality grade video service subscriber to a higher quality grade service subscriber without the costly expense of replacing his already installed lower quality grade video service hardware.

An object of the coding system of the present invention is to code higher quality video signals by means of an algorithm that is compatible with both higher quality and lower quality video service subscribers.

An additional object of the coding system of the present invention is to code higher quality video signals by means of an algorithm that incorporates hardware blocks that are common to video subscribers at all levels of quality.

SUMMARY OF THE INVENTION

In accordance with the present invention, each frame of a high quality video signal is decomposed into plural bands using a two-dimensional subband decomposition. The lowest frequency band in both the horizontal and vertical directions (the baseband) is coded using an interframe coder such as a hybrid discrete cosine transform/differential pulse code modulation (DCT/DPCM) coder, which in the disclosed embodiment is the aforenoted CCITT proposed standard (H.261) coder. The other decomposed frequency bands are coded using either interframe differential pulse code modulation (DPCM) or direct intraframe pulse code modulation (PCM). Specifically, those bands corresponding to the diagonal variation in the coding frame are coded using direct intraframe PCM, and those other bands corresponding to the horizontal and vertical edge variation in the coding frame are coded using interframe DPCM.

Different levels of quality of video service are available to users who subscribe to increased layers of coded subbands. For example, a low quality user subscribes to only the first layer signal consisting of the coded lowest frequency baseband subband. This subscriber's receiver comprises the CCITT hybrid DCT/DPCM codec, which reconstructs a low quality video signal from the decoded low frequency subband. Other signal layers include groups of successively higher frequency subband signals which are separately coded and multiplexed for transmission. A higher quality subscriber thus subscribes to the first layer signal and one or more additional signal layers. At the receiver of the higher quality subscriber, each signal layer is demultiplexed and the component coded subband signals are then used together to reconstruct the higher quality video signal.

In the disclosed embodiment, an HDTV signal is decomposed using a 7-band nonuniform two-dimensional quadrature mirror filtering (QMF) decomposition. The decomposed lowest frequency band is spatially transformed to be compatible with the aforenoted CIF format so that it can be coded by the interframe hybrid DCT/DPCM CCITT standard codec. The output of this codec represents the Layer 1 signal. The second, third and fourth decomposed bands (representing the second level of decomposition of the lowest frequency band of the first level of decomposition) are coded using interframe DPCM and direct PCM, where direct PCM is used to code the diagonal higher frequency band. The three coded bands are multiplexed together to form a Layer 2 signal. A subscriber of a higher quality signal receives the Layer 1 and Layer 2 signals. At the receiver, the Layer 2 signals are demultiplexed and separately decoded and combined with the decoded Layer 1 signal to reconstruct, from these four subband signals, a video signal having one-quarter the spatial resolution of the input HDTV video signal. The fifth, sixth and seventh decomposed bands (representing the higher frequency bands at the first level of decomposition) are coded using interframe DPCM and direct PCM, where direct PCM is used to code the diagonal higher frequency band. These three coded bands are multiplexed together to form a Layer 3 signal. The subscriber to the highest quality video signal receives all three signal layers. The seven decoded subbands are then used to reconstruct a video frame having the spatial resolution of the originally transmitted high quality HDTV signal.

DETAILED DESCRIPTION

Figure 1:
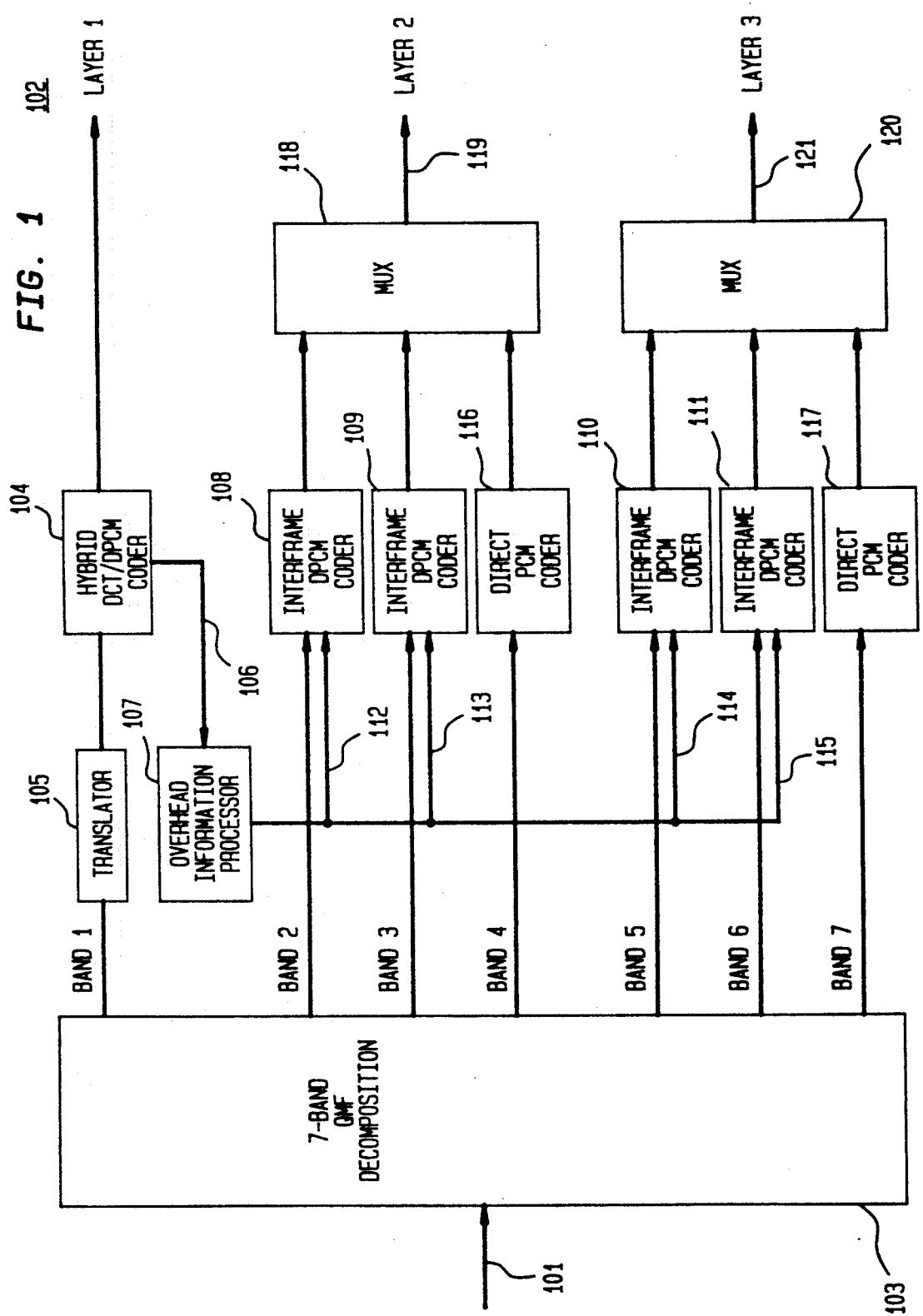
FIG. 1 is a block diagram of the multilayer universal video coder of the present invention.

With reference to FIG. 1, a high definition digitized video signal on input lead 101 is applied to the video coder 102 of the present invention. This signal consists of digitized sequential picture elements (pels) on each scan line, video frame after video frame. Since there is, as yet, no agreed upon format for HDTV signals in either analog or digital format, the digital HDTV signal on lead 101 will be assumed for purposes of the specific embodiment described herein to have a spatial resolution of 1920 pels×1024 scan lines. This digital signal is applied to a seven-band non-uniform quadrature mirror filter (QMF) decomposer 103. QMF decomposer 103 performs a standard, well known in the art, two-dimensional non-uniform decomposition of the input digital video signal into seven bands. An example of this type of signal decomposition is described in an article co-authored by the inventor herein and A. Tabatabai entitled "Sub-band Coding of Monochrome and Color Images," *IEEE Trans. on Circuits and Systems*, vol 35, pp. 207-214, February 1988.

Figure 2:
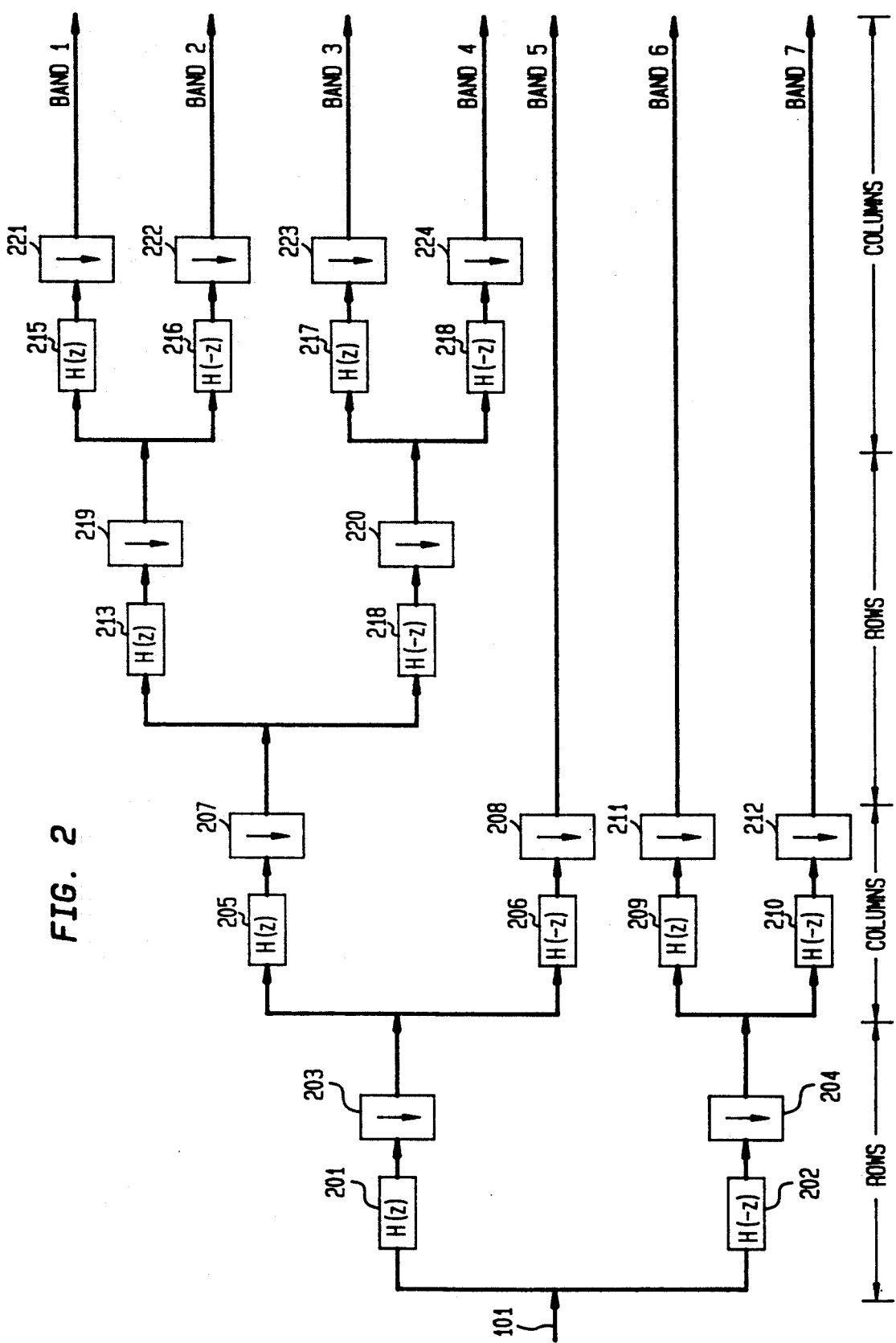
FIG. 2 is a block diagram of the two-dimensional seven-subband QMF decomposer used in FIG. 1.

FIG. 2 shows a block diagram of the seven-band non-uniform QMF decomposer 103. In this decomposer the input digital pels on 101 are filtered in the horizontal direction along the rows into low and high frequency bands by low-pass and high-pass digital filters 201 and 202, respectively, having filter characteristics of $H(z)$ and $H(-z)$. These filtered low and high band samples are decimated by down-converts 20-3 and 204 to eliminate alternate filtered samples. These down-converted low and high band filtered samples are then filtered into low and high bands in the vertical direction along the columns. The low band filtered and down-converted samples are filtered into low and high bands in the vertical direction by low pass and high pass filters 205 and 206 having the same filter characteristics of $H(z)$ and $H(-z)$, respectively. These filtered low—low and low-high signals are then decimated by down-converts 207 and 208, respectively. Similarly, the high band filtered and decimated samples at the output of down-converter 204 are filtered and decimated into high-low and high-high bands by the combination of low and high pass filters 209 and 210, respectively, and down-converters 211 and 212. The low-low band at the output of down-converter 207 is then further decomposed in two-dimensions to form a low-low-low-low band 1, a low-low-low-high band 2, a low-low-high-low band 3, and a low-low-high-high band 4, by similar operation of the combination of low pass and high pass digital filters 203-218 and down-converters 219-224.

Figure 3:
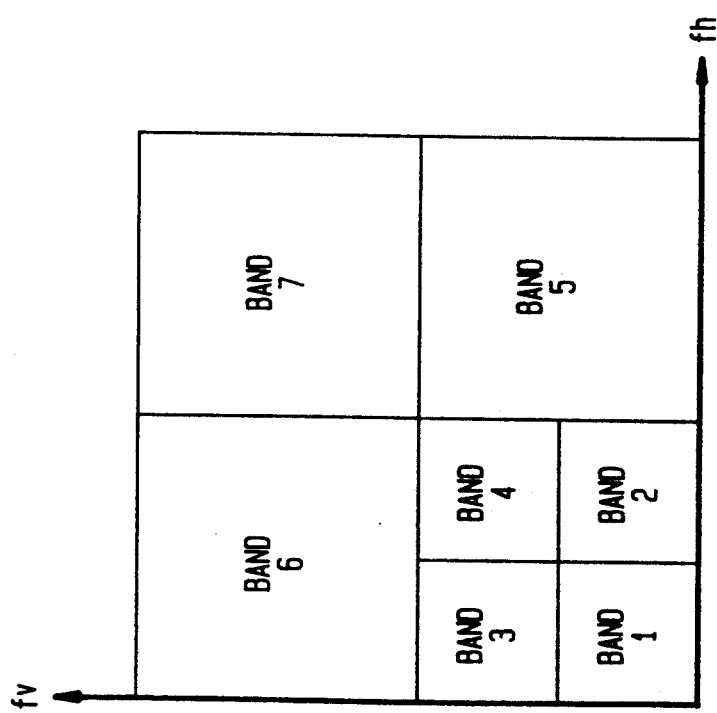
FIG. 3 shows two-dimensional bandwidth splitting of the input spectrum into seven subbands.

FIG. 3 shows the bandwidth splitting in the horizontal and vertical directions of the original spectrum into the seven subbands, band 1-band 7. Each of bands 1-4, through the double two-dimensional decomposition, has 1/16 the number of samples per video frame than the pels per video frame of the high definition signal on lead 101. The original 1920 pels ×1024 lines are reduced to 480 samples ×256lines for bands 1-4. Bands 5-7, through the single two-dimensional decomposition, reduces the 1920×1024 pels per video frame to 960 samples×512 lines per video frame.

Figure 4:
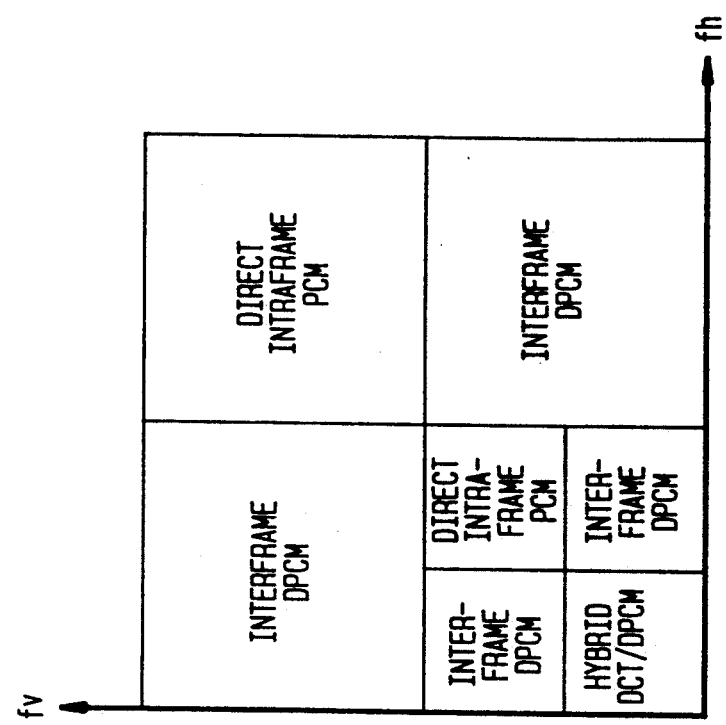
FIG. 4 shows the type of coder used to encode each of the seven subbands.

Band 1 is the baseband and its coded samples per frame represent a miniature version, at 1/16th the resolution, of the high definition input signal. For maximum coding efficiency the baseband signal is coded for transmission using interframe coding (i.e. using information from a previous frame, which may incorporate as part of its coding scheme, one of any well known motion compensation prediction technique. The other bands are coded using a combination of interframe DPCM coding (i.e. coding frame-to-frame filtered value pel differences) and direct PCM intraframe (i.e. coding each of the pel filtered value within a frame directly in accordance with its own PCM value) coding. In particular, horizontal bands 2 and 5, the sample values of which represent edge variations in the vertical direction in the video frame, and vertical bands 3 and 6, the sample values of which represent edge variations in the horizontal direction in the video frame, are coded using interframe coding with or without motion compensation, to take maximum advantage of the frame-to-frame redundancy. The diagonal band 4 and 7, the sample values of which represent the diagonal variations in the video frame, are directly coded by intraframe PCM since it has been experimentally found that there is no advantage, with respect to coding efficiency, to use interframe prediction in these bands. FIG. 4 shows the type of inter/intraframe coding used by the coding system of the present invention for each of the corresponding seven subbands of FIG. 3.

Figure 5:
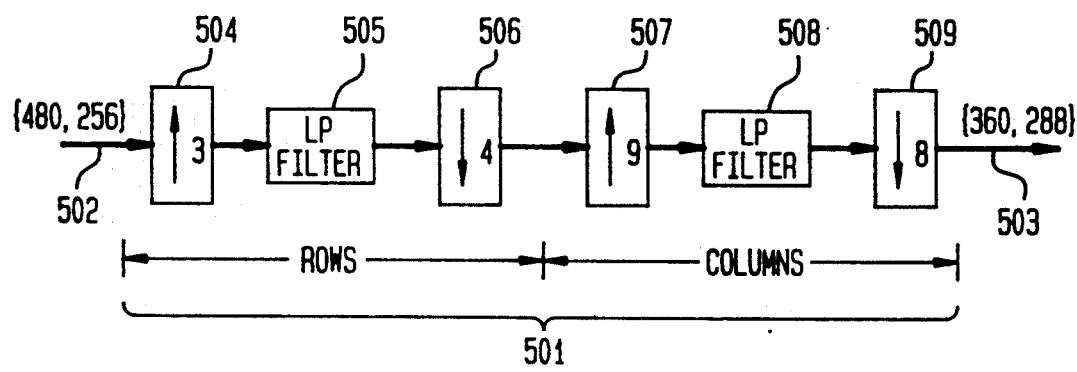
FIG. 5 is a block diagram of a signal translator which translates the spatial resolution of the lowest horizontal and vertical frequency band to a format which is compatible with the CIF format for coding by the CCITT proposed standardized interframe hybrid DCT/CPCM coder.

In the embodiment of the present invention shown in FIG. 1, for purposes of compatibility with the low speed CCITT proposal (H.261), the baseband (band 1) is coded using a hybrid DCT/CPCM coder 104, which is disclosed in the aforenoted CCITT reference, and which coding format is also disclosed in U.S. Pat. No. 4,821,119 issued to the inventor herein on Apr. 11, 1989. Since the CCITT proposal is based on a CIF signal format (360 pels×288 lines), the band 1 signal (480 pels×256 pels) must be translated by a signal translator 105 into the CIF format prior to being input to the coder 104. FIG. 5 is a block diagram of a standard signal format translator 501, which converts the 480×256 input on lead 502 to a 360×288 output on lead 503. Since 480=3(480)/4 and 256=9(288)/8, the band 1 samples per video frame are adjusted in both the horizontal row direction and the vertical column direction. A long each row of samples, an up-converted 504 up-converts by a factor of three by adding two zero values samples between each input sample value. The up-converted signal is then low-pass filtered by digital filter 505 and then down-converted by a factor of four by down-converter 506 (by discarding every three out of four sampled values). Then, along each column of samples, up-converter 507 up-converts by a factor of nine, digital low-pass filter 508 filters the up-converted signal, and down-converter 509 down-converts by a factor of eight. The resultant output on lead 503 then has a resolution of 360×288 samples per video frame.

With reference back to FIG. 1, the signal at the input to hybrid DCT/DPCM coder 104 is in a compatible format for processing by a CCITT format coder. The output of this coder 104 thus represents a Layer 1 signal. A subscriber to only the low-quality video teleconferencing service and who has a CCITT compatible codec will thus be able to decode and reconstruct the input HDTV signal on lead 101 at the reduced CIF format resolution.

As aforenoted, coder 104 may incorporate motion compensation prediction to increase signal compression. The motion displacements estimated by coder 104 for the lowest band, band 1, are passed over lead 106 to an overhead information processor 107 which processes the displacement vectors for use by the interframe DPCM coders of the other bands. In addition, processor 107 is used to signal the DPCM interframe coders of the other bands when the low band coder 104 detects a scene change, which then requires each of the other coders to switch to a PCM intraframe mode for at least one video frame. Bands 2, 3, 5 and 6 are coded by interframe DPCM coders 108, 109, 110 and 111, respectively. These video interframe DPCM coders are of a type such as described by the inventor in an article entitled "Subband-Based CCITT Compatible Video Coding," *Proceedings IEEE GLOBECOM'90*, Dec. 1990. Overhead information processor 107 provides motion compensation predicting information and scene change information to these interframe DPCM coders 108–111 via leads 112–115, respectively. Alternatively, each coder 108–111 may use its own independently estimated motion displacements instead of utilizing the motion displacements estimated for the lowest band. Block classification information from band 1 can also be provided by processor 107 to bands 2, 3, 5 and 6.

The diagonal bands, band 4 and band 7, are coded by direct PCM intraframe coders 116 and 117, respectively, since it has ben found, as previously noted that there is not advantage in interframe prediction in these bands. Coder 116 and 117 are therefore standard, well known in the art, PCM coders.

The outputs of coders 108, 109 and 116 are multiplexed together for transmission by multiplexer 118. The multiplexed digital signal on lead 119 represent the Layer 2 signal, which in combination with the Layer 1 signal can be used by a subscriber to reconstruct a intermediate quality video signal having a resolution of 960 pels ×512 lines. The coded outputs of coders 110, 111, and 117 are similarly multiplexed by multiplexer 120 to form a Layer 3 signal on lead 121. A subscriber receiving all three Layer signals can reconstruct the original high definition video signal of 1920 pels ×1024 lines on input lead 101.

Figure 6:
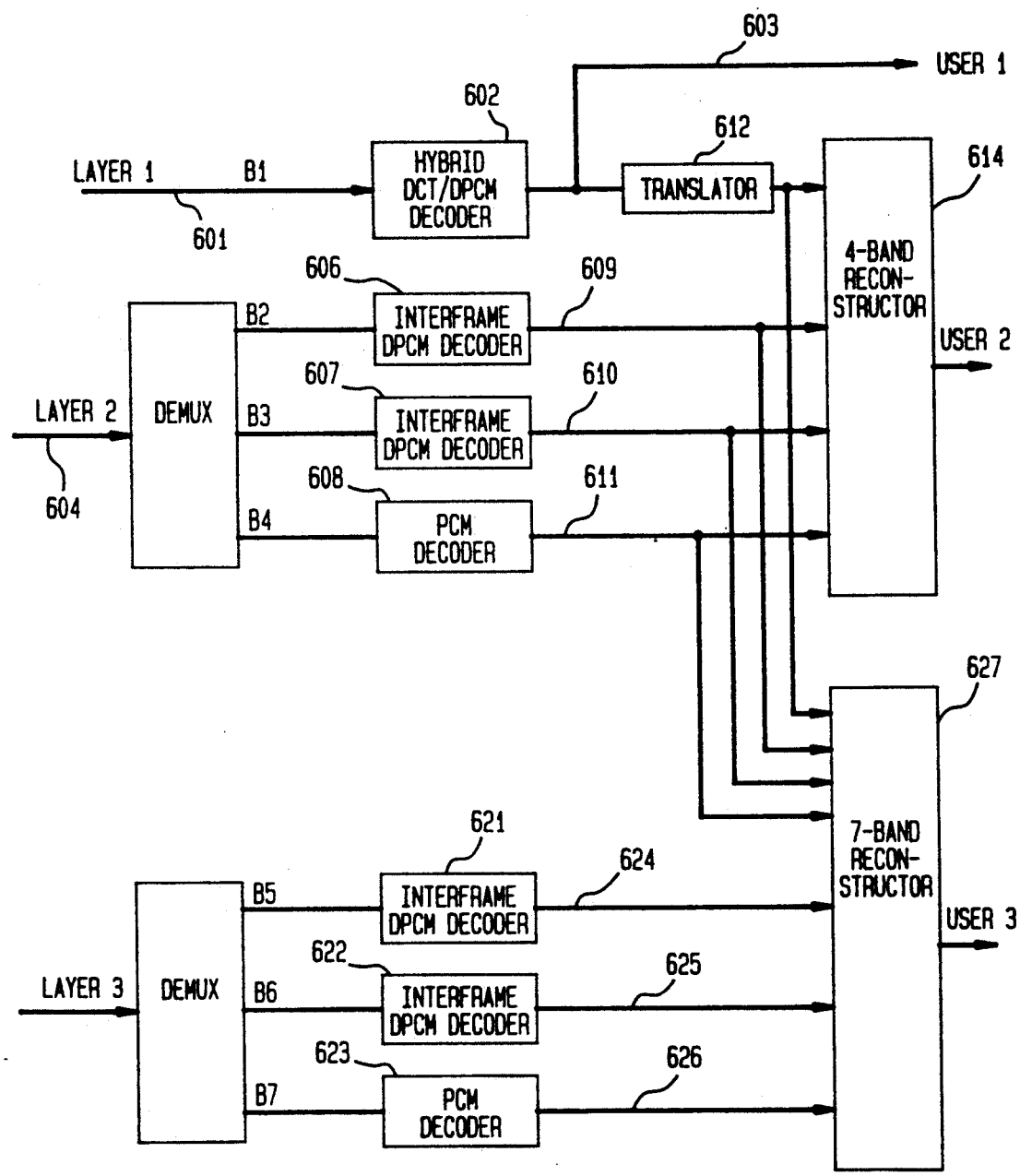
FIG. 6 is a block diagram of a multilayer universal video decoder corresponding to the coder of FIG. 1.

With reference to FIG. 6, a decoder is shown for decoding and reconstructing three layer signals for three levels of video quality user, i.e. a low-quality subscriber, an intermediate-quality subscriber, and a high-definition subscriber. In actual practice, however, a receiver will not include all the components shown in FIG. 6 since a subscriber will subscribe to only one particular level of service. A subscriber will thus only receive the appropriate layer signals necessary to decode and reconstruct the signal at his subscribed to level of service. Accordingly, only those receiver components necessary to decode and reconstruct that level of service are required at the receiver. Advantageously, and as heretofore noted however, users at all three levels or service have the low-level decoder apparatus in common, which in this embodiment is the CCITT proposed standardized H.261 hybrid DCT/DPCM decoder. A user can therefore migrate from being a low-quality subscriber to a higher quality subscriber by adding additional apparatus to his already installed decoder, without replacing his basic decoder unit.

In FIG. 6, the Layer 1 signal is received on input 601 and applied to the hybrid DCT/DPCM decoder 602. Decoder 602 is the decoder portion of the above-referenced CCITT proposed standardized H.261 video codec. The output of decode 602 on lead 603 in the CIF signal form (360 pels ×288 lines), can be supplied to a low-quality video subscriber, user 1. The Layer 2 signal on in input 604 id demultiplexed by demultiplexer 605 to produce coded band 2 (B2), band 3 (B3), and band 4 (B4) which are decoded by DPCM interframe decoder 606, DPCM interframe decoder 607, and PCM decoder 608, respectively. The decoders are standard DPCM and PCM decoders corresponding the above-referenced DPCM and PCM coders. The outputs of decoders 606, 607 and 608 on outputs 609, 610 and 611, respectively, represent the band 2, band 3 and band 4 decomposed signal samples at the output of QMF filter 103 in FIG. 1. These signals having a format of 480 samples ×256 lines per video frame are used together with the baseband band 1 signal at the output of decoder 602 to reconstruct the intermediate quality video signal having 960 pels ×512 lines per video frame.

Figure 7:
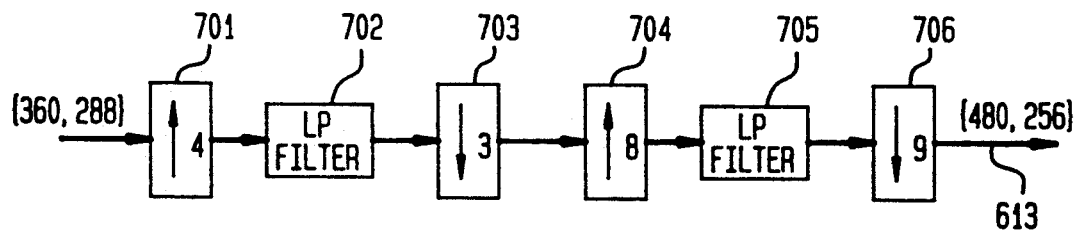
FIG. 7 is a block diagram of a signal translator which converts the spatial resolution the output of the CCITT proposed standardized interframe hybrid DCT/DPCM decoder back to the resolution of the originally decomposed lowest horizontal and vertical frequency band.

As aforenoted, the output of decoder 602 has the CIF signal format of 360 pels ×288 lines per video frame. Therefore, in order to properly combine the output of decoder 602 with the outputs of decoders 607–608, the signal format of the output of decoder 602 must be translated by a signal translator 612. FIG. 7 shows a signal translator 612 similar to the signal translator 105 in FIG. 5, which is used to translate the band 1 signal format at the output of QMF filter 103 in FIG. 1 to the CIF format. The input on 603 is first processed in the horizontal direction across the rows of samples per video frame by up-converting by a factor of four in up-converter 701, low-pass filtering by digital filter 702, and then down-converting by a factor of three by down-converter 703, which together increase the horizontal resolution by a factor of 4/3 to 480 samples. The resultant signal is then processed in the vertical direction, down each column of samples, by first up-converting by a factor of eight by up-converter 704, low-pass filtering by digital filter 705, and then down-converting by a factor of nine by down-converter 706, which together reduce the vertical resolution by a factor of 8/9 to 256 lines of samples. Accordingly, the output of translator 612 on lead 613 has the desired signal resolution of 480 samples ×256 lines per video frame, which is compatible with the format of the decoded band 2 - band 4 signals on leads 609–611, respectively.

Figure 8:
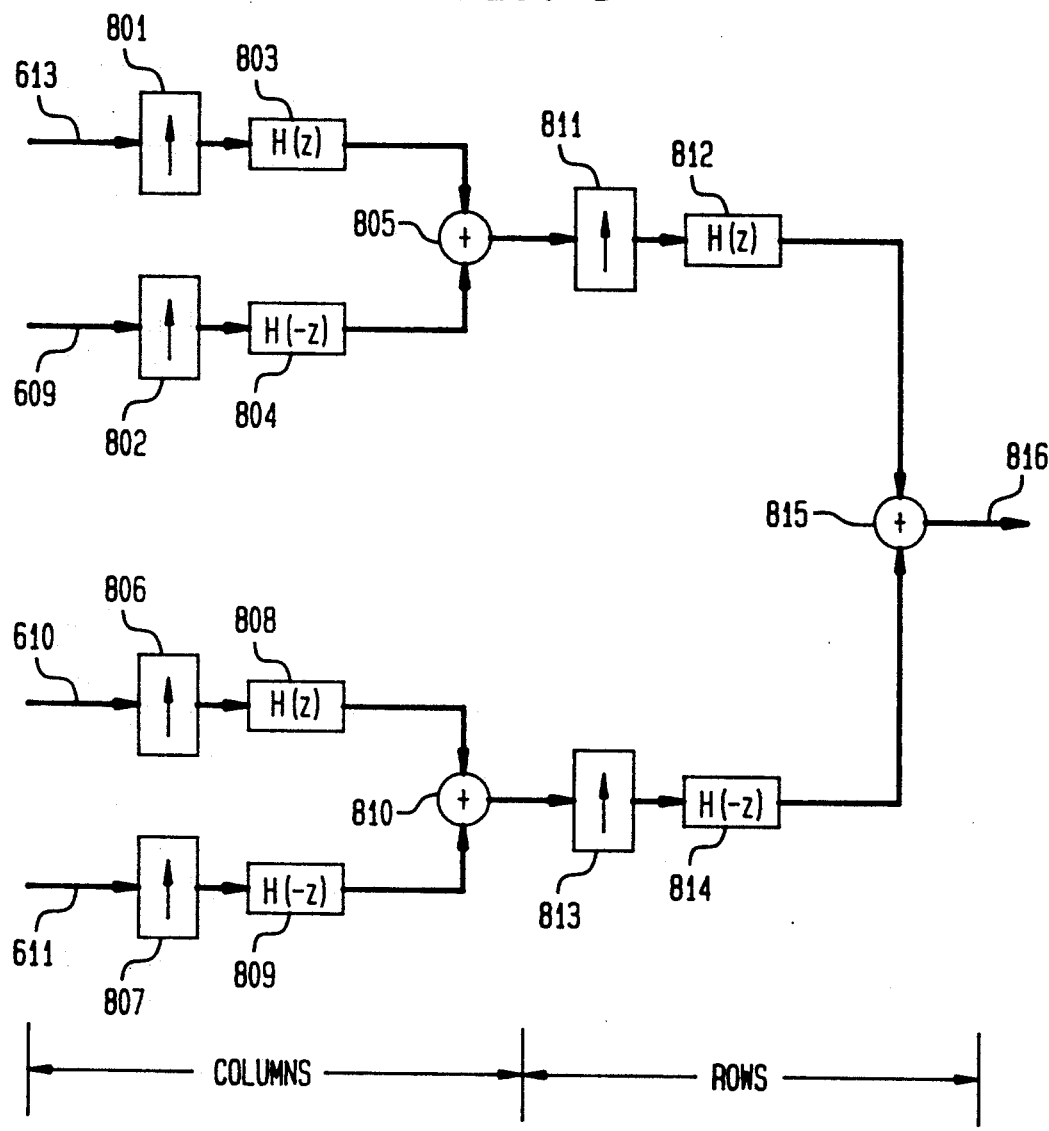
FIG. 8 is a block diagram of a 4-band signal reconstructor which reconstructs an intermediate quality video signal from the received and decoded layer 1 and layer 2 signals.

A 4-band reconstructor 614 reconstructs a video signal from the four input subbands signal on inputs 613, 609, 610 and 611. Reconstructor 614 is a standard, well known in the art, 4-band QMF subband reconstructor, and is shown in block format in FIG. 8. Reconstructor 614 processes the four input band 1 - band 4 signals in mirror-image to the decomposition of the original signal. Therefore, these four signals are processed first in the vertical direction and then in the horizontal direction. In FIG. 8, the band 1 signal is up-converted in the vertical direction by a factor of two by up-converter 801 and the band 2 signal is similarly up-converted in the vertical direction by a factor of two by up-converter 802. The output of up-converter 801 is low-pass filtered by digital filter 803 having a filter characteristic H(z), the same the filter characteristic as the filters in the signal decomposer in FIG. 2. The output of up-converter 802 is similarly high-pass filtered by digital filter 804 having a filter characteristic H(−z). The sample outputs of filters 803 and 804 are summed by adder 805. The band 3 and band 4 signals on input 610 and 611 are similarly processed in the vertical direction by up-converters 806 and 807; low-pass and high-pass digital filters 808 and 809, respectively; and adder 810. The sample outputs of adders 805 and 810 are then processed in the horizontal direction. Up-converter 811 up-converts the output of adder 805 horizontally across the rows by a factor of two and low-pass digital filter 812 filters the up-converted samples. Similarly, up-converter 813 up-converts the output of adder 810 horizontally across the rows by a factor of two and high-ass digital filter 814 filters these up-conversed samples. The outputs of filters 812 and 814 are combined, sample by sample by adder 815, to produce an output on lead 816 having twice the horizontal and vertical resolution of the individual four input subband signals on input 613, 609, 611, and 611, i.e. 960 pels ×512 scan lines per video frame. With reference back to FIG. 6, the user 2 subscriber is connected to the output of reconstructor 614 and is able to generate an intermediate-quality video signal from the received Layer 1 and Layer 2 signals.

User 3 subscribes to all three layers of signal, receiving layers 1, 2 and 3. Thus, in addition to layer 1 which is decoded by the hybrid DCT/DPCM decoder 602, and layer 2 which is demultiplexed and decoded by interframe DPCM decoders 607 and intraframe PCM decoder 608, layer 3 is demultiplexed by demultiplexer 602 to form three coded subbands signals (B5, B6 and B7) for bands 5, 6 and 7. Signals B5 and B6 are decoded by interframe DPCM decoders 621 and 622, respectively, and signal B7 is decoded by PCM decoder 623. The resultant band 5, band 6 and band 7 is subband signals on leads 624, 625 and 626, respectively, are combined in seven-band reconstructor 627 with the band 1 subband signal on lead 613 and the bands 2, 3 and 4 subband signals on leads 609, 610, and 611, respectively.

Figure 9:
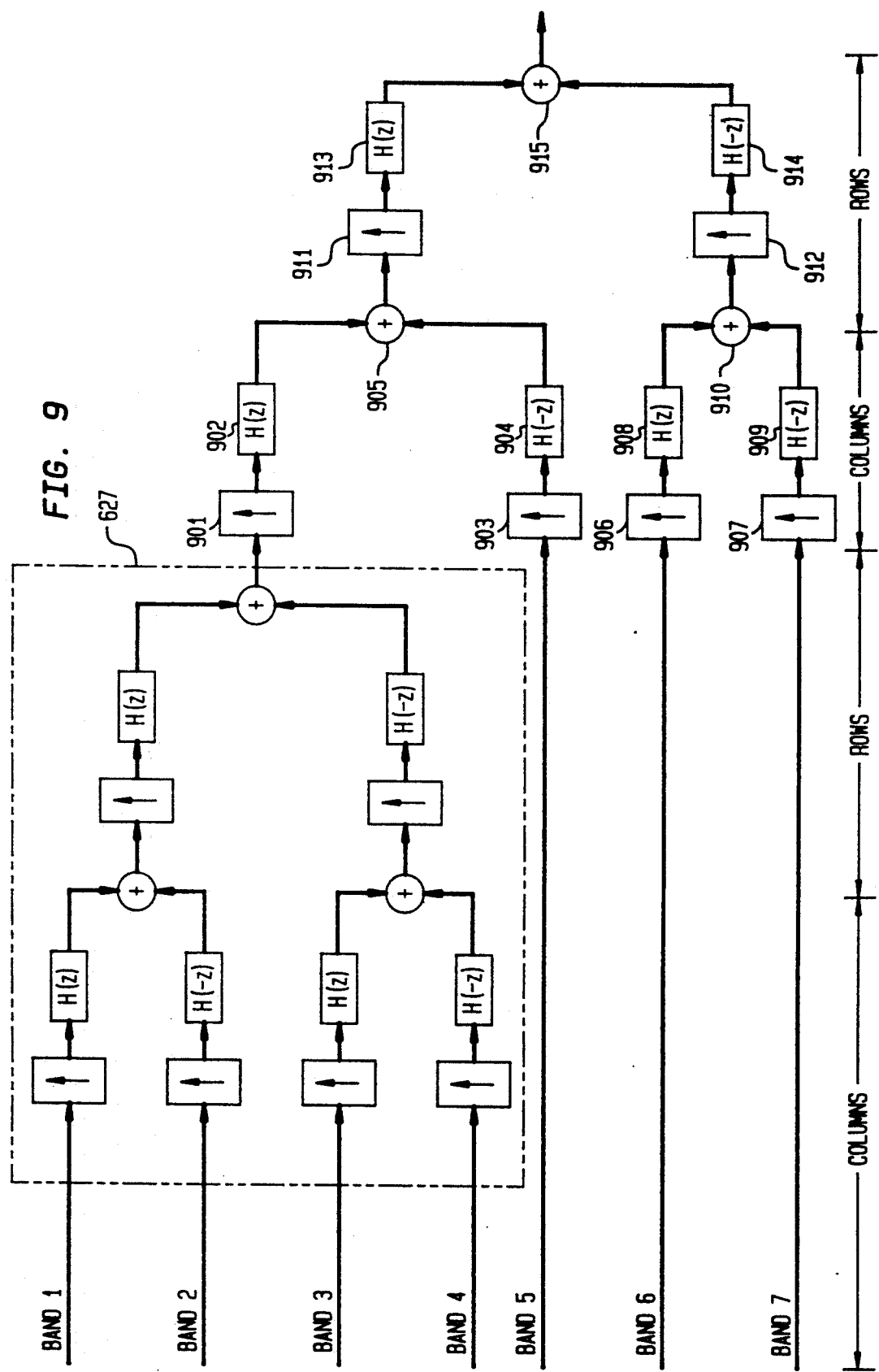
FIG. 9 is a block diagram of a 7-and signal reconstructor which reconstructs the full resolution HDTV video signal from the received and decoded layer 1, layer 2 and layer 3 signals.

Seven-band reconstructor 627 is shown in block diagram format in FIG. 9. Reconstructor performs the inverse functions of the seven-band decomposer shown in FIG. 2. Incorporated within reconstructor 627 is the structure of the above-described 4-band reconstructor 614, shown in FIG. 9 within the dotted box. The 960 sample ×512 line output of reconstructor 614, representing bands 1-, is up-converted in the vertical direction along the columns by up-converter 901 and low-pass filtered by digital filter 902. The 960 sample ×512 line band 5 signal on lead 625 is similarly up-converted in the vertical direction by up-converter 903 and filtered by high-pass digital filter 904. The 960 sample ×1024 line outputs of filters 902 and 904 are summed by adder 905. The bands 6 and 7 signals are similarly up-converted and filtered by up-converters 906 and 907, and digital filters 908 and 909, and the outputs of the filters 908 and 909 are summed by adder 910. The outputs of adders 905 and 910 are then each up-converted along the rows in the horizontal direction by up-converters 911 and 912, respectively. The output of up-converter 911 is filtered by low-pass digital filter 913 and the output of up-converter 912 is filtered by high-pass digital filter 914. The resultant filtered outputs are summed, sample by sample by adder 915 to form a 1920 pel ×1024 line per video frame high-definition video output to user 3.

With reference back to FIG. 6, it can be seen that the user by subscribing to increasing layers of signals can improve the quality, i.e. resolution, of his recovered video signal. A lower-quality subscriber is, however, still able to receive and recover a transmitted high-definition signal, albeit at only his subscribed to lower-quality level of service.

The above-described embodiment is illustrative of the principles of the present invention. Other embodiments could be devised by those skilled in the art without departing from the spirit and scope of the present invention.

What is claimed is:

1. A signal coder for coding a video signal into plural layer output signals, the signal coder comprising:

means for receiving an input signal consisting of digital pel values of a scanned video signal, said video signal consisting of sequential video frames, each video frame consisting of a plurality of scan lines in the horizontal direction, each scan line consisting of a plurality of pels, the pels in each frame forming rows in the horizontal direction and columns in a vertical direction perpendicular to the horizontal direction;

quadrature-mirror filter means for decomposing in the horizontal direction along each row and in the vertical direction down each column the pel values of each current video frame of pel values into plural narrow band subband sequences of filtered pel values;

first interframe coding means for coding the lowest horizontal-lowest vertical frequency subband of filtered pel values of the current frame using the lowest horizontal-lowest vertical frequency subband of filtered pel values of a previous frame to form a first layer output signal;

plural secondary coding means each one of coding one of the plural narrow band subband sequences of filtered pel values of the current frame other than the subband of filtered pel values coded by said first interframe coding means, each one of said secondary coding means being either an intraframe-type coder which directly codes the filtered pel values of the current frame or an interframe-type coder which codes differences between the filtered pel values of the current frame and corresponding filtered pel values of a previous frame, and;

at least one combining means for combining the coded outputs of selected of said plural secondary coding means to form at least a second layer output signal;

wherein video signal of increasingly higher spatial resolutions can be reconstructed from combinations of increasing numbers of the layer output signals.

2. A signal coder in accordance with claim 1 wherein said first interframe coding means for coding the lowest-horizontal lowest vertical frequency subband is hybrid discrete cosine transform (DCT)/differential pulse code modulation (DPCM) coding means.

3. A signal coder in accordance with claim 2 wherein each of the subband sequences of filtered pel values of those bands that correspond to the horizontal and vertical edge variations in the input video frame, are coded by one of said plural secondary coding means that is an interframe-type coder, and each of the subband sequences of filtered pel values of those bands that correspond to the diagonal variations in the input video frame are coded by one of said plural secondary coding means that is an intraframe-type coder.

4. A signal coder in accordance with claim 3 further comprising overhead information processing means for deriving motion displacement information from said hybrid DCT/DPCM coding means and for supplying the derived motion displacement information to each one of said plural secondary coding means that is an interframe-type coder.

5. A signal coder in accordance with claim 2 wherein said quadrature-mirror filter means nonuniformly decomposes in the horizontal and vertical directions that pel values of each video frame of pel values into seven subbands of filtered pel values comprising a low horizontal-low vertical-low horizontal-low vertical (LLLL) frequency subband, a low horizontal-low vertical low-horizontal high-vertical (LLLH) frequency subband, a low-horizontal low-vertical high-horizontal low-vertical subband (LLHL) frequency subband, a low-horizontal low-vertical high-horizontal high-vertical (LLHH) frequency subband, a low-horizontal high vertical (LH) subband, a high-horizontal low-vertical (HL) frequency subband, and a high-horizontal high-vertical (HH) frequency subband, said hybrid DCT/DPCM coding means coding said LLLL frequency subband, and one each of said plural secondary coding means that is an interframe-type coder coding each of said LLLH, said LLHL, said LH and said HL fluency subbands, and one each of said plural secondary coding means that is an intraframe-type coder coding each of said LLHH and said HH frequency subbands, a first of said at least one combining means for combining the coded outputs of said LLLH, said LLHL, and said LLHH frequency bands to form a second layer output signal, and a second of said at least one combining means for combining the coded outputs of said LH, said HL, and said HH frequency bands to form a third layer 6. A method of coding a video signal into plural layer output signals comprising the steps of:

receiving an input signal consisting of digital pel values of a scanned video signal consisting of sequential video frames, each video frame consisting of a plurality of scan lines in the horizontal direction, each scan line consisting of a plurality of pels, the pels in each frame forming rows in the horizontal direction and columns in a vertical direction perpendicular to the horizontal direction;

decomposing in the horizontal direction along each row and in the vertical direction down each column the pel values of each current video frame of pel values into plural narrow band subband sequences of filtered pel values;

coding the filtered pel values in the lowest horizontal-lowest vertical frequency subband of the current frame using the lowest horizontal-lowest vertical frequency subband of filtered pel values of a previous frame to form a first of a plurality layer output signal;

coding each of the plural narrow band subband sequences of filtered pel values of the current frame other than the lowest horizontal-lowest vertical frequency subband using either an interframe-type coder or an intraframe-type coder;

combining selected of the coded narrow band subband sequences of pel values of the current frame other then the lowest horizontal-lowest vertical frequency subband to form at least a second layer output signal;

wherein video signals of increasingly higher spatial resolution can be reconstructed from increasing numbers of the layer output signals.

7. The method of claim 6 wherein a hybrid DCT/DPCM interframe coder is used to code the filtered pel values in the lowest horizontal-lowest vertical frequency subband of the current frame.

* * * * *